United States Patent Office 3,492,274
Patented Jan. 27, 1970

3,492,274
METHOD OF INHIBITING FOAM GENERATION IN THE MANUFACTURE OF TEREPHTHALATE POLYESTERS
Burton E. Lederman, Conshohocken, Pa., and William H. Steinmetz, Collingswood, N.J., assignors to E. I. du Pont de Nemours and Company, Wilmington, Del., a corporation of Delaware
No Drawing. Filed Oct. 31, 1967, Ser. No. 679,548
Int. Cl. C08g *17/003, 17/08*
U.S. Cl. 260—75    4 Claims

ABSTRACT OF THE DISCLOSURE

A method is disclosed for reducing foaming in the preparation of terephthalate polyesters which comprises adding a liquid aliphatic hydrocarbon to the foaming reaction mixture in an amount of 0.01–10% by weight based on the reaction mixture; the liquid aliphatic hydrocarbon having a boiling point at atmospheric pressure in the range of 150–300° C.

BACKGROUND OF THE INVENTION

This invention relates broadly to the preparation of terephthalate polyesters and more particularly to a method of inhibiting foam generation during the preparation of terephthalate polyesters.

Numerous materials have been suggested in the prior art for use as defoaming agents in the preparation of resin dispersions. None, however, have been disclosed for inhibiting foam formation at high temperatures significantly above the boiling point of water.

Many of the prior art processes for directly esterifying terephthalic acid involved the use of superatmospheric pressures. Such elevated pressures do help to lessen the foaming problem, although they do not eliminate foaming entirely. In addition, it is frequently not economical or desirable to operate at such high pressures. Thus, it is quite clear that the use of superatmospheric pressures is quite often not a satisfactory solution to the foaming problem.

SUMMARY OF THE INVENTION

A method has now been found for inhibiting foaming in the preparation of terephthalate polyesters by direct esterification of terephthalic acid and dihydric alcohols at elevated temperatures. This process comprises adding at least one liquid aliphatic hydrocarbon to the foaming reaction mixture in an amount of from about 0.01% to about 10% by weight based on the reaction mixture. The liquid aliphatic hydrocarbon has a boiling point at atmospheric pressure in the range of 150–300° C.

Use of the defoaming agents of this invention results in the advantage of permitting the control of foaming at elevated temperatures in excess of the boiling point of water. An additional advantage is that the defoaming agents of this invention can be removed from the reaction mass by heating the reaction mass to a temperature in excess of the boiling point of the defoaming agent.

DESCRIPTION OF THE INVENTION

The defoaming agents of this invention are useful in the polymerizations of terephthalic acid with dihydric alcohols or diols known as direct esterifications. In ordinary transesterification polymerization methods, terephthalate esters are prepared by (1) an ester interchange reaction followed by (2) a polymerization reaction. By direct esterification techniques, high molecular weight polyesters can be formed by simply mixing the reactants together and heating them to an elevated temperature at which polymerization takes place. In other words, the ester interchange step is eliminated in a direct esterification. Elevated pressures are sometimes used although direct esterifications can be readily carried out at atmospheric pressures. In addition, esterification and polymerization catalysts can be used in direct esterifications to accelerate the reactions.

Direct esterification polymerizations considered illustrative of the type encompassed within this application are illustrated in the following patents, which are all hereby incorporated by reference: Cramer, U.S. 3,024,220, issued Mar. 6, 1962; Munro et al., U.S. 3,050,533, issued Aug. 21, 1962; Munro et al., U.S. 3,050,548, issued Aug. 21, 1962; Sebelist et al., U.S. 3,057,909, issued Oct. 9, 1962; Ringwald, U.S. 3,060,152, issued Oct. 23, 1962; Meyer et al., U.S. 3,185,668, issued May 25, 1965; McKinney, U.S. 3,185,669, issued May 25, 1965; McKinney, U.S. 3,185,670, issued May 25, 1965; Roeser, U.S. 3,245,959, issued Apr. 12, 1966; and Whinfield et al., U.S. 2,465,319, issued Mar. 22, 1949. In addition, direct esterification processes for the preparation of terephthalate polyesters are illustrated in the following literature references: (1) Polyesters, by V. V. Korshak and S. V. Vinogradova, translated from Russian by B. J. Hazzard, Pergamon Press, New York (1965), pp. 15, 180–181 and 388: (2) Experimental Plastics and Synthetic Resins by G. F. D'Alelio, John Wiley & Sons, New York (1960), pp. 138 et seq.

In direct esterifications, it is often convenient and desirable to use terephthalic acid having a small particle size to insure that the reaction proceeds at an acceptable rate. Unfortunately, in general, the smaller the particle size of the terephthalic acid, the more serious the foaming problem will become. Therefore, it is particularly advantageous to use the defoaming agents of this invention when some or all of the terephthalic acid has a small particle size. Terephthalic acid considered to have small particle size for the purposes of this invention has the consistency of powdered flour.

Any other dicarboxylic acid or dicarboxylic acid equivalent can be used in combination with the terephthalic acid of this invention. These acids and acid equivalents can be combined in various combinations to provide polyesters or copolyesters with a wide variety of properties. Some of the physical properties which can be changed by varying the dicarboxylic acid systems include the degree of crystallinity, toughness, solubility, elasticity, softening point, adhesiveness, and durability of the polyester products. Examples of acids suitable for use with the terephthalic acid include aromatic acids, such as orthophthalic acid, homoterephthalic acid, hydrogenated terephthalic acid, isophthalic acid, and such saturated aliphatic acids as malonic, succinic, glutaric, adipic, pimelic, suberic, azelaic, and sebacic and any acid equivalents of these compounds. Halogenated aromatic dicarboxylic acids or their equivalents such as chlorendic anhydride, tetrabromophthalic anhydride, and tetrachlorophthalic anhydride can also be used as reactants to provide product polyesters having fire preventive properties.

The term dicarboxylic acid equivalent is used to include compounds which will produce the same number of reactive carboxyl groups as those compounds' corresponding dicarboxylic acids will produce in a condensation reaction. For example, one mole of dimethyl terephthalate and one mole of terephthalic acid will each produce two reactive carboxylic acid groups in a condensation reaction; therefore, dimethyl terephthalate is an acid equivalent of terephthalic acid. Similarly, adipoyl chloride is an acid equivalent of adipic acid and phthalic anhydride is an acid equivalent of phthalic acid. Also, sodium dimethyl-5-sulfoisophthalate is an acid equivalent of sodium 5-sulfoisophthalic acid.

The defoaming agents of this invention are used with reactants wherein the terephthalic acid comprises at least 15% (molar) of the dicarboxylic acid equivalents. Amounts below this normally do not present a foaming problem. Higher amounts of terephthalic acid are often used.

The other reactant used to form the polyesters of this invention is the dihydric alcohol or diol. Suitable diols include aliphatic diols containing from 2–10 carbon atoms, cycloaliphatic diols, aromatic diols, and heterocyclic diols. Specific examples of suitable dihydric alcohols include ethylene glycol, diethylene glycol, 1,4-butanediol, 1,5-pentanediol, 1,4-butene-2-diol, 1,2-propanediol, 1,3-propanediol, 1,6-hexanediol, 1,3-cyclo-butanediol, 1,4-cyclohexanediol, 1,4-cyclohexane dimethanol, 2,2-dimethyl propanediol-1,3,hydrogenated bis-diphenol dimethyl methane, epoxylated tetrachlorohydroquinone and chlorinated bisphenol.

Of course dihydric alcohol equivalents can be used in place of the above dihydric alcohols. The term dihydric alcohol equivalent refers to compounds which will produce the same number of reactive hydroxy groups as those compounds' corresponding dihydric alcohols in a condensation reaction. Some examples of dihydric alcohol equivalents include bis-phenol and dihydroxy benzenes.

As is well known, the formation of an ester from an alcohol and an acid is a condensation reaction and the stoichiometry is 1/1 on a molar basis. Therefore, it is necessary to have an amount of dihydric alcohol equivalents present which is substantially equal to the total amount of the dicarboxylic acid equivalents present. As a practical matter, an excess of up to about 10% (molar) of the dihydric alcohol is usually present in the reaction product. Excess alcohol, which can be present in the reaction mixture in an amount of about 100–200%, is removed during polymerization by distillation.

Direct esterification reactions are traditionally carried out at elevated temperatures and can be carried out at superatmospheric pressure or at atmospheric pressure. For purposes of this invention, elevated temperatures are temperatures substantially above room temperature. Temperatures in excess of 100° C. are preferred because excellent reaction rates are obtained at such elevated temperatures.

Liquid aliphatic hydrocarbons suitable for use as the defoaming agents of this invention have a minimum boiling point of about 150° C. and a maximum boiling point of about 300° C., both being measured at atmospheric pressure. When a hydrocarbon cut containing more than one constituent with different boiling points is used, the major amount of the cut should boil within the aforementioned range. The particularly preferred liquid aliphatic hydrocarbons have boiling points in the range of about 170° C. to about 230° C. These are preferred because the esterification reaction of terephthalic acid takes place largely in this temperature range and it is in this range that the danger of foaming is greatest. Since it appears that the foam breaking effect is accomplished in the liquid phase or at the liquid surface and not in the vapor distillate, it is preferred that the defoamer be sufficiently high boiling to be present substantially in the liquid phase at temperatures of 170° C. to 230° C. The upper limit on the boiling point for the liquid aliphatic hydrocarbons is about 300° C. because it is desirable that the defoaming agent be substantially removed in the polymerization of the ester prepolymer at temperatures of about 275° C. to 285° C. under $10^{-2}$ to 2 millimeters of mercury vacuum. The liquid aliphatic hydrocarbons are removed so that the adhesive qualities of the polyesters produced, both as adhesives and as adherends, is not adversely affected. Other properties of the terephthalate polyesters, such as melting point, flow properties and surface lubricity, could also be adversely affected if a significant amount of the aliphatic hydrocarbons is left to remain in the products.

Some examples of liquid aliphatic hydrocarbon defoaming agents considered within the scope of the present invention include kerosene, heavy mineral spirits, nonane, decane, 2,7 - dimethyloctane, dodecane, hexadecane, tridecane, and the various other isomers of these compounds. Heavy mineral spirits are a water white liquid petroleum fraction composed of aliphatic hydrocarbons whose evaporation rate lies between that of mineral spirits and kerosene. They have a specific gravity of approximately 0.80 to 0.81 at 25° C./25° C. Heavy mineral spirits are commercially available from many sources including the Atlantic Refining Co. under the designation #58 Special Heavy Mineral Spirits. Kerosene is also a water white liquid which is a high boiling petroleum fraction composed of aliphatic hydrocarbons. Kerosene has a specific gravity of about 0.790 to 0.812 at 25° C./25° C., and is also available commercially from many suppliers including the Atlantic Refining Co. under the designation of Rayolite Oil.

The liquid aliphatic hydrocarbon defoaming agents of this invention are added to the reaction mixture only as foaming occurs and only in amounts necessary to control or reduce the foaming to a permissible level. Adding an anticipatory amount of the defoaming agent to the reaction mixture before the reaction begins has not proved successful in controlling foaming and in some cases can actually aggravate the foaming problem.

Many modifications can be made in the process illustrated above which are considered within the scope of this invention. For example, the polyesters prepared can be modified by adding small amounts of monofunctional acid derivatives to achieve special results such as end-capping the product polymers. Likewise, minor amounts of modifying agents such as the metallic salts of sulfonated aromatic compounds as disclosed in Griffing et al., U.S. Patent 3,018,272, issued Jan. 23, 1962, can be added to improve special characteristics of the polyesters. Modifications with any coreactants are considered within the scope of this invention as long as the minimum quantity of terephthalic acid is used in direct esterfication.

The process of this invention is useful in eliminating or controlling excessive foaming in the preparation of terephthalate polyesters by direct esterfication. The product polyesters are in turn useful in preparing coating compositions and adhesive compositions by techniques which are conventional in the art.

EXAMPLE 1

The reaction equipment comprises a three-necked flask fitted with a thermometer, agitator, and an overhead fractionating column which is topped by a Dean-Stark trap and a water cooled reflux condenser. The three-necked flask is heated with an electric mantle.

The following ingredients are charged to the three-necked flask:

| | Grams |
|---|---|
| Azelaic acid | 125.4 |
| Sodium sulfonate of dimethylisophthalate | 6.0 |
| Terephthalic acid | 109.6 |
| 5-tert-butylisophthalic acid | 146.6 |
| Ethylene glycol | 372.0 |
| Tetrabutyl titanate | 1.14 |
| Total | 760.74 |

The reaction mixture is heated with moderate agitation to a temperature of 150–170° C. whereupon the reaction, with the distillation of water, begins. Heating to the initial reaction temperature is done slowly to reduce the tendency toward foaming. When the reaction mixture reaches temperature, only enough heat is provided to obtain a moderate to slow water take-off rate which also helps to control foaming. However, excessive foaming is often experienced despite the use of such precautionary measures in the mechanical operations.

Esterfication takes place over a period of 4–6 hours and becomes complete as the reaction mass temperature rises to the range of 230–245° C. Completion is evidenced by the end of the water evolution, a falling off of the overhead temperature, and a lowering of the acid number of the mass to less than 5. Heating is continued to 275° C. over 1 to 2 hours with the evolution of glycol and some polymerization taking place.

Serious foaming begins any time after the initial esterification reaction temperature of approximately 150° C. is reached and can continue throughout the reaction until esterfication is completed at a temperature of about 230° C. During foaming, the reactant mass is driven up into the fractionating column causing many problems. To reduce the foaming, kerosene is added as necessary through the fractionating column to meet the advancing foam. The addition knocks the foam down and keeps it from entering the overhead column. This procedure is repeated as required as long as not more kerosene than an amount equal to 10% of the initial reaction mass is added.

When the reaction is complete, vacuum distillation is started at a reduced pressure of 2 millimeters of mercury or less in the temperature range of 250–280° C. During the vacuum distallation, any excess glycol and the kerosene are removed. The distillation is completed after approximately 2–3 hours, when the viscosity has increased to a point where the stirrer is slowed at a constant power input. At this point, the vacuum is broken and the resin is poured into cooling pans.

The product polyester produced has a melting point of 129° C., relative viscosity of 1.5259 measured as 0.58% solution in m-cresol at 25° C., and acid number of 2.3, and is soluable in most common solvents except aliphatic hydrocarbons.

EXAMPLE 2

The procedure of Example 1 is followed except that the following ingredients are changed to the three-necked flask:

| | Grams |
|---|---|
| Tetrephthalic acid | 182.6 |
| Azelaic acid | 171.0 |
| Ethylene glycol | 186.0 |
| Tetraisopropyl titanate | 0.25 |
| Sodium acetate | 0.80 |
| Antimony trioxide | 0.25 |
| Total | 540.90 |

During the entire reaction time, 15–20 grams total of heavy mineral spirits are added in small portions as required to control the foaming. Foam suppression is excellent and a product terephthalate polyester is produced with a flow melt point of 125° C., relative viscosity of 1.5100 measured as a 0.58% solution in m-cresol at 25° C. and an acid number of 2.7. The product is not soluble in ordinary hydrocarbon solvents or ordinary alcohol, ketone or ester solvents, but is soluble in chlorinated hydrocarbon solvents.

What is claimed is:

1. A method for reducing foaming in the preparation of terephthalate polyesters by direct esterfication of terephthalic acid and a dihydric alcohol at elevated temperatures which comprises adding at least one liquid aliphatic hydrocarbon to the foaming reaction mixture in an amount of from about 0.01% to about 10% by weight based on the initial reaction mixture, said liquid aliphatic hydrocarbon having a boiling point at atmospheric pressure of from about 150° C. to about 300° C.

2. The method of claim 1 wherein the liquid aliphatic hydrocarbon has a boiling point at atmospheric pressure of from about 170° C. to about 230° C.

3. The method of claim 2 wherein the liquid aliphatic hydrocarbon is heavy mineral spirits.

4. The method of claim 2 wherein the liquid aliphatic hydrocarbon is heavy mineral sprits.

References Cited

UNITED STATES PATENTS

| 3,024,220 | 3/1962 | Cramer | 260—75 |
| 3,245,959 | 4/1966 | Roeser | 260—75 |

OTHER REFERENCES

Gaden et al.: Chem. Eng. 63, (10) 173–84 (1956) (p. 178 supplied).

Anon., Fed. Reg. 30, 7997–97 (June 22, 1965) (Chem. Abstr. supplied).

WILLIAM H. SHORT, Primary Examiner

M. GOLDSTEIN, Assistant Examiner

U.S. Cl. X.R.

55—87; 252—321; 260—475

PO-1050
(5/69)

UNITED STATES PATENT OFFICE
CERTIFICATE OF CORRECTION

Patent No. 3,492,274      Dated January 27, 1970

Inventor(s) Burton E. Lederman and William H. Steinmetz

It is certified that error appears in the above-identified patent and that said Letters Patent are hereby corrected as shown below:

Claim 3, column 6, line 25, that portion reading "heavy mineral spirits" should read -- kerosene --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents